United States Patent [19]

Richards

[11] Patent Number: 4,667,916

[45] Date of Patent: May 26, 1987

[54] OVERHEAD HANGER AND JOINT CONSTRUCTION

[76] Inventor: Peter S. Richards, 100 Mount Si Pl. NW., Issaquah, Wash. 98027

[21] Appl. No.: 811,939

[22] Filed: Dec. 20, 1985

[51] Int. Cl.$^4$ ............................................. B42F 13/00
[52] U.S. Cl. .................................... 248/343; 403/372; 403/260
[58] Field of Search ................... 248/317, 74.1, 188.9, 248/59, 70, 342-344, 58; 16/39; 403/377, 260, 370, 245; 411/103, 111, 112

[56] References Cited

U.S. PATENT DOCUMENTS

| | | | |
|---|---|---|---|
| 1,031,462 | 7/1912 | Paine | 16/39 |
| 1,753,183 | 4/1930 | Johnson | 16/39 |
| 1,768,505 | 6/1930 | Carr | 411/112 |
| 2,190,555 | 2/1940 | Toce et al. | 287/20 |
| 2,281,279 | 4/1942 | Fox | 67/23 |
| 2,798,748 | 7/1957 | Maurer | 287/52 |
| 2,922,455 | 1/1960 | Braendel | 411/103 |
| 2,950,937 | 8/1960 | Bedford | 403/372 |
| 2,972,495 | 2/1961 | Yalen | 403/260 |
| 3,009,747 | 11/1961 | Pitzer | 308/71 |
| 3,135,033 | 6/1964 | Jackson | 24/122.3 |
| 3,271,056 | 9/1966 | Frisbey | 403/260 |
| 3,355,201 | 11/1967 | Barwick | 287/119 |
| 3,506,227 | 4/1977 | Jenkins | 248/59 |
| 3,633,862 | 1/1972 | Breem | 248/251 |
| 3,779,659 | 12/1973 | Habert | 403/372 |
| 4,134,703 | 1/1979 | Hinners | 403/104 |
| 4,573,652 | 3/1986 | Richards | 248/74.1 |

FOREIGN PATENT DOCUMENTS 668912  3/1952  United Kingdom ............. 248/188.9

Primary Examiner—Reinaldo P. Machado
Assistant Examiner—Alvin Chin-Shue
Attorney, Agent, or Firm—Delbert J. Barnard

[57] ABSTRACT

A support leg (14) is attached to a ceiling structure (10) by means of a threaded stud (12) which mates with a threaded opening (18) in an insert (16) which is swage connected to the upper end of the support leg (14). A flat bar (22) is attached to the lower end of the support leg (14) so that it extends horizontally and makes a "T" with the support leg (14). An expansion clamp assembly (28, 36, 40, 44, 50, 46, 74) is carried by the bar (22). This assembly is plugged into the tubular lower end portion (26) of the support leg (14). Wing portions (58) of a nut wing washer (50) are deflected by the insertion of the assembly into the tubular portion (26), and edges (62) of the wings (58) are biased into a tight gripping contact with the inner tubular portion (26). This secures the nut wing washer (50) and a nut (46) against rotation. Then, the member (22) is rotated, relative to the support leg (14), causing a relative endwise movement of a stud (28) carried by the member (22) into the nut (46). This movement causes a cam surface (40) on a cam ring (36) to be moved against wings (66) on one or more main locked washers (44), in a direction deflecting the wings outwardly, and moving the edges (70) on the wings (66) into a tight displacing engagement with the inner wall of the socket (26). Rotation of the member (22) is continued until the member (22) is securely fastened to the support leg (14).

22 Claims, 15 Drawing Figures

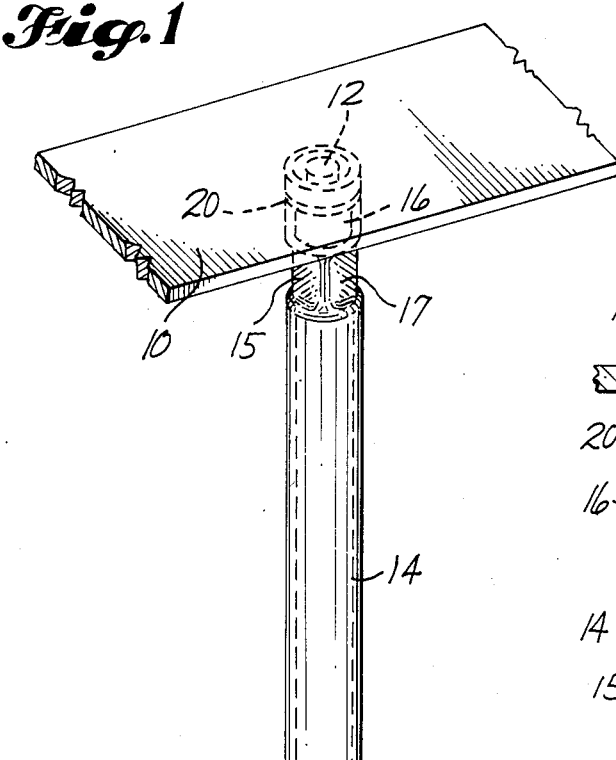
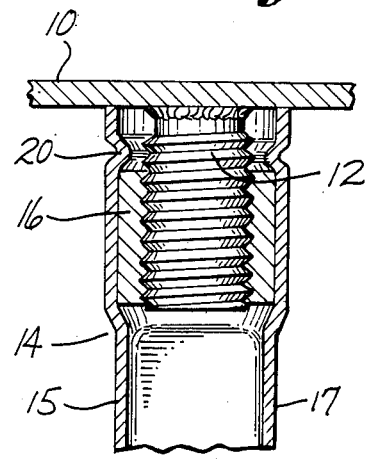
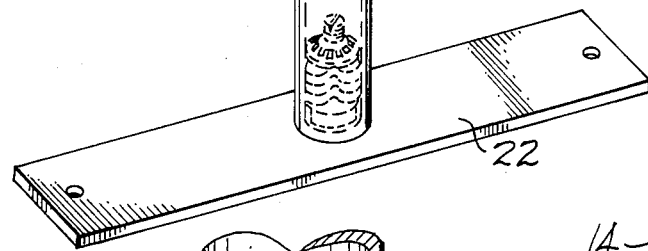
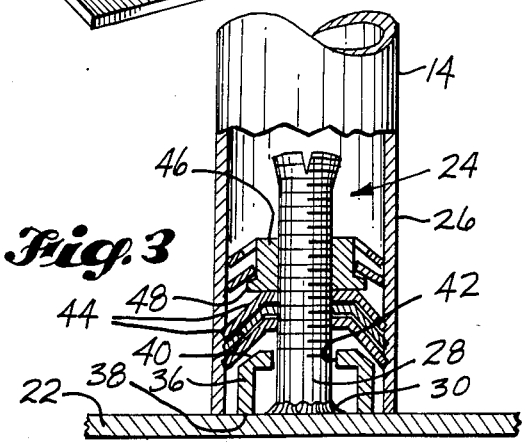
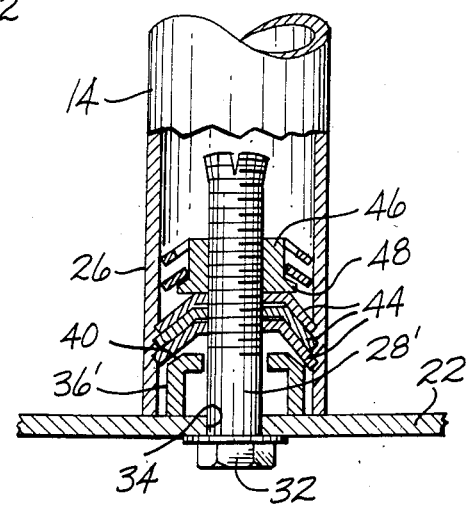

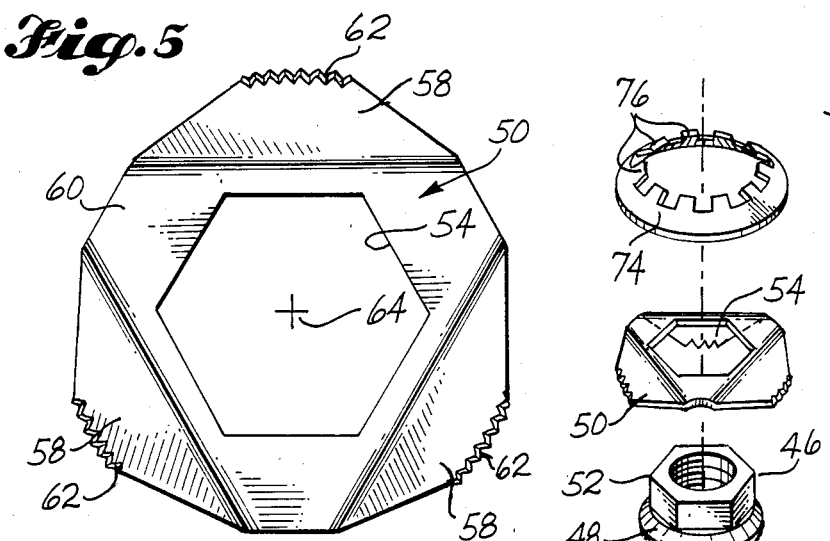
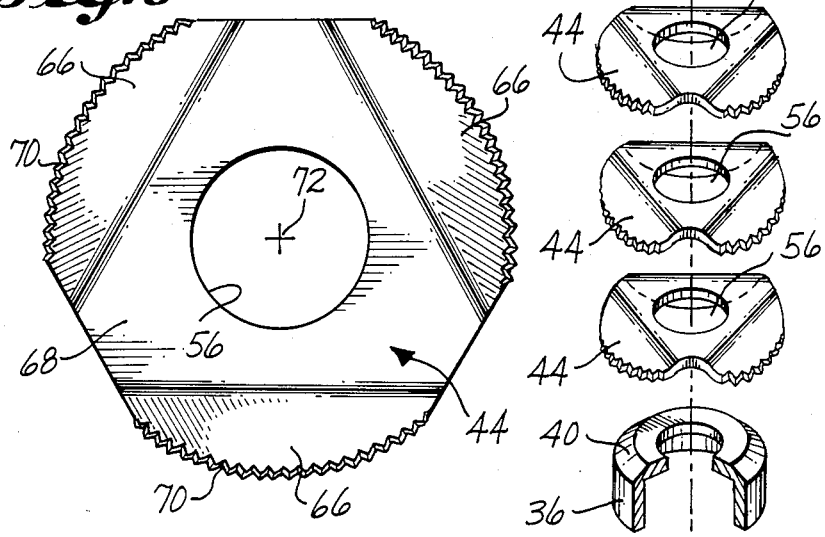
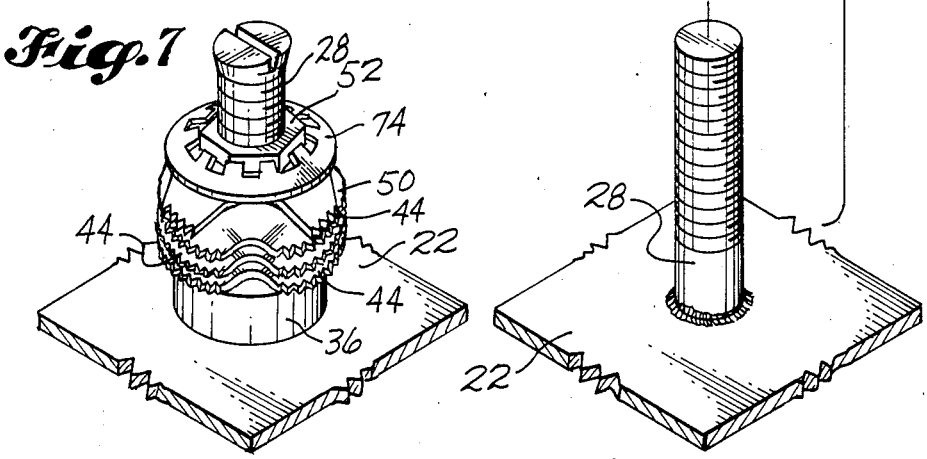

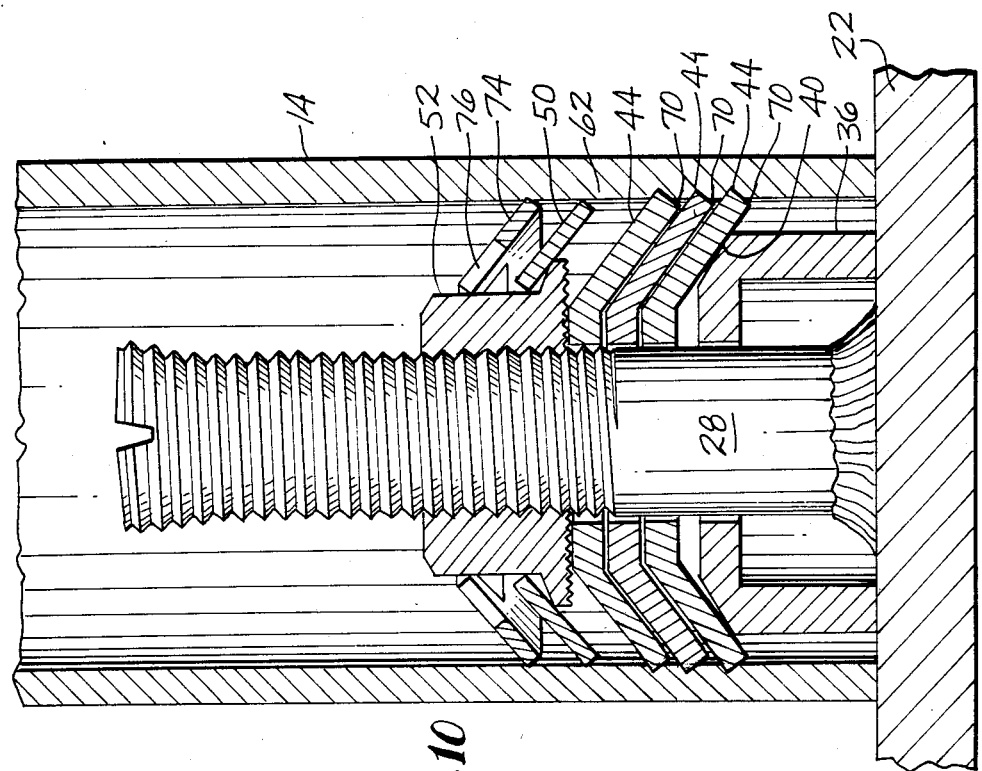
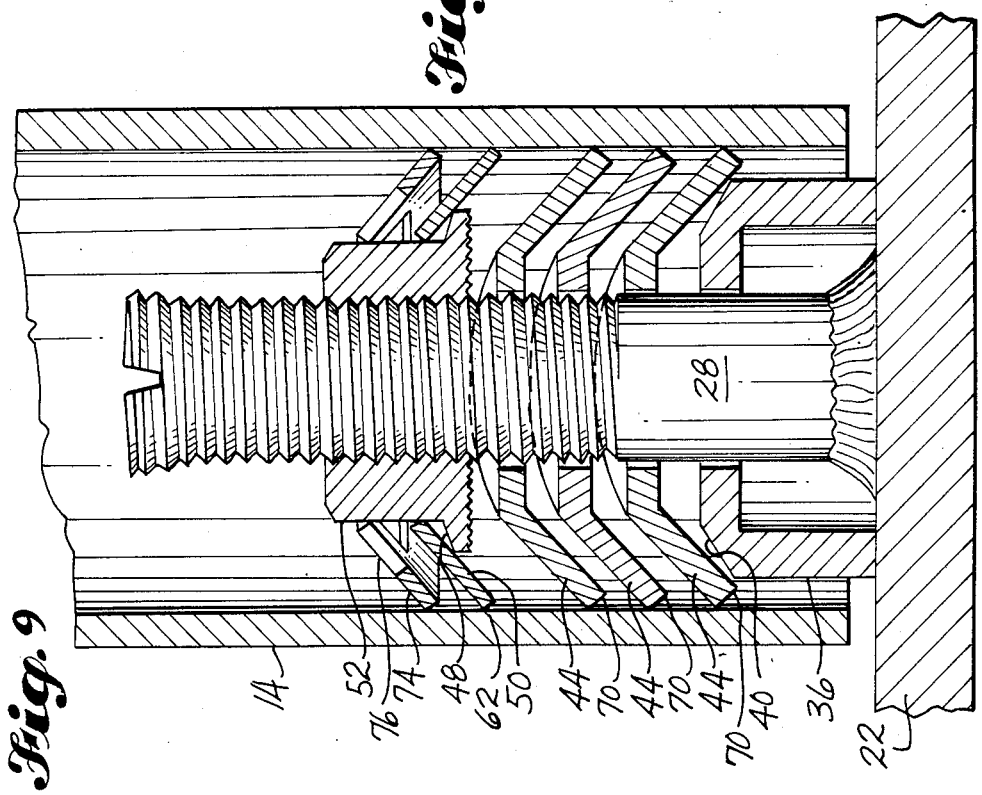

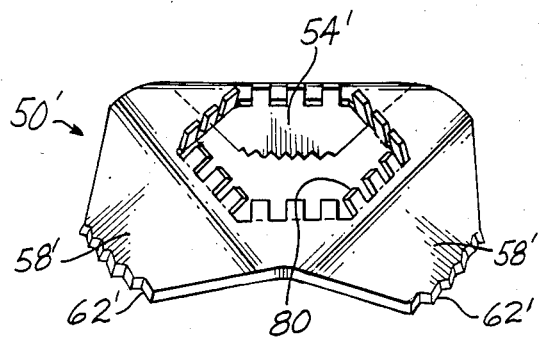
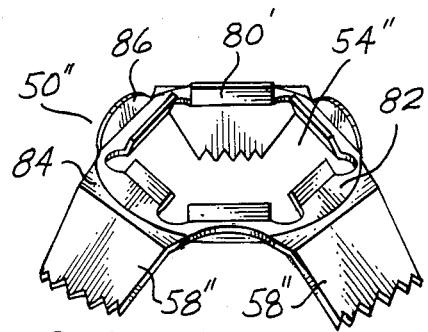
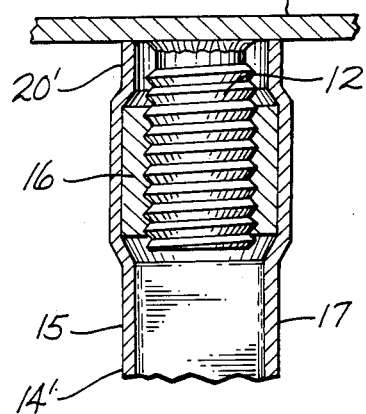
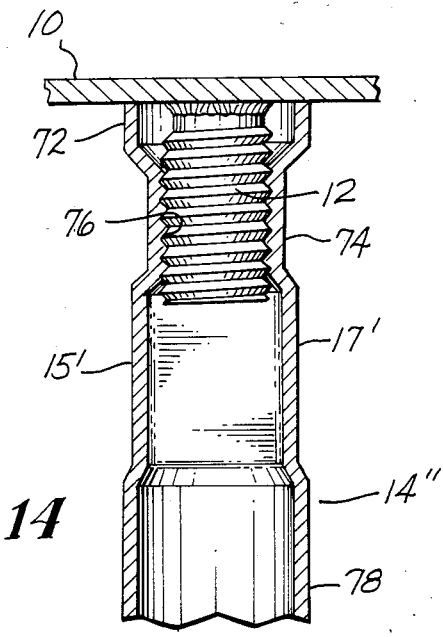

OVERHEAD HANGER AND JOINT CONSTRUCTION

DESCRIPTION

1. Technical Field

This invention relates to a joint construction between two members, one of which includes a socket, and in particular to a joint construction including an expansion connector assembly carried by the other member that is merely plugged into the socket and then rotated, to provide a strong and firm connection between the two members.

2. Background Art

The general concept of a expansion connector is old. This type of connector comprises a first part which is in the nature of an insert and a second part which includes a socket for the insert. The insert is inserted into the socket and expanded to exert a clamping or holding force on the wall of the socket.

Examples of expansion connectors which can be found in the patent literature are shown by the following U.S. Pat. No. 2,190,555, granted Feb. 13, 1940, to Charles A. Toce, Robert F. Broussard and William N. Woodruff; U.S. Pat. No. 2,281,279, granted Apr. 28, 1942, to David A. Fox; U.S. Pat. No. 2,798,748, granted July 9, 1957, to Albrecht Maurer; U.S. Pat. No. 3,009,747, granted Nov. 21, 1961, to Kenneth H. Pitzer; U.S. Pat. No. 3,135,033, granted June 2, 1964, to Samuel H. Jackson; U.S. Pat. No. 3,355,201, granted Nov. 28, 1967 to Leroy E. Barwick; U.S. Pat. No. 3,779,659, granted Dec. 18, 1973 to Roger Habert; and U.S. Pat. No. 4,134,703, granted Jan. 16, 1979, to Earl S. Hinners.

The mechanisms disclosed by these patents should be carefully considered for the purpose of putting the present invention into proper perspective relative to the prior art.

The present invention relates to the provision of a new and unique joint construction comprising a first member which includes an expansion insert. The insert is merely slipped endwise into a socket carried by the second member, and then one of the members is simply rotated relative to the other, and the insert functions to dig into the wall of the socket and in that manner securely connect the two members together.

Another object of the invention is to provide an improved mounting structure for a suspended object (e.g. a lighting fixture) which utilizes the joint construction, and which makes it possible for the user to disassemble and then later reassemble the mounting structure, without the use of destructive methods (e.g. removing parts by use of metal cutting equipment).

Ship construction is done in stages. Quite often, a component is installed and then it is discovered that the component must be removed in order to either install another component, or perform some other stage of the construction of the ship. Light fixtures must be securely affixed to the ceiling structure and this has in the past been done by welding the upper ends of support leg members to the ceiling and welding cross members to the lower ends of the support leg members, and then bolting the light fixtures to the cross members. When a mounting structure was installed in this way it became necessary to remove it in a destructive manner, such as by use of a cutting torch. The mounting structure of the present invention provides a way of easily connecting and disconnecting the parts of the mounting structure to each other and to the ceiling structure, so that if it becomes necessary to remove the mounting structure, it can be done without destructive affects to this component, so that such component can be reused. The mounting structure of the present invention makes it easy to raise or lower a lighting fixture or similar object. The mounting structure need only be disassembled and then reassembled with a longer or shorter support leg.

DISCLOSURE OF THE INVENTION

In basic form the joint construction of the present invention comprises a first member which includes a cylindrical sidewall defining a socket having an inner surface, and a second member which includes a connector assembly that plugs into the socket. The connector assembly comprises a fixed stud having a base, a free end and a threaded portion adjacent the free end. A cam ring is provided at the base of the stud. The cam ring has a base end and an opposite end. The cam ring is smaller in diameter than the inside diameter of the socket. The cam ring includes a beveled edge at its opposite end. At least one main locking disc is located on the stud. Each main locking disc includes a central opening through which the stud extends, and a plurality of wings spaced around the disk and formed towards the beveled edge of the cam ring. Each main locking disc is sized to slip fit into the socket. A nut is threaded onto the threaded portion of the stud, outwardly of the main locking disc(s). A starter nut wing washer is in some manner secured to the nut. The nut wing washer has a plurality of wings which are bent to extend toward the cam ring. It also has a plan form that is larger than the inside diameter of said socket.

The two members are easily and quickly connected together by a slip-in movement of the connector assembly on the second member into the tubular socket of the first member. This slip-in movement causes a bending of the wings of the nut wing washer, attended by edges of such wings gripping the inner surface of the socket. Next, one of the members is rotated relative to the other. The grip of the edges of the wings of the nut wing washer holds the nut wing washer against rotation relative to the socket. The nut wing washer is secured against rotation to the nut, and so the nut also is held in position relative to the first member during the rotation. As a result, there is an axial travel of the nut on the stud toward the cam ring. Such axial travel causes the beveled edge of the cam ring to push the wings of the main lock disc(s) outwardly, so as to press their edges into tight galling engagement with the inner surface of the socket.

In accordance with another aspect of the invention, a joint construction of the type described above is provided at the lower end of a support leg. The connector assembly is a part of a frame member which is connected to the lower end of the support leg. The upper end of the support leg is connected to an overhead structure, such as a ceiling, or the like. In preferred form, this mounting structure is used for suspending an object from the overhead of the ship. The upper end of the support leg is secured to a portion of the ceiling and the frame member is attached to the lower end of the support leg, in the manner described above.

Also in preferred form, the upper end of the support leg is provided with a screw connection between it and a base member that is connected to the ceiling. This construction allows the mounting structure to be easily and quickly removed without injury to the components of the mounting structure.

Other more detailed features of the invention are described below in connection with the description of the illustrated embodiments.

BRIEF DESCRIPTION OF THE DRAWINGS

Like reference numerals are used to designate like parts throughout the several views of the drawings, and:

FIG. 1 is an isometric view of a mounting structure constituting a preferred embodiment of the invention;

FIG. 2 is an enlarged scale fragmentary view of a detachable threaded connection at the upper end of a support leg and a plate which is welded or otherwise secured to a ceiling structure or the like;

FIG. 3 is a view like FIG. 2, but at the lower end of the support leg, showing a connector assembly at that end which is a portion of a preferred embodiment of the invention;

FIG. 4 is a view like FIG. 3, but showing a modified form of the connector assembly;

FIG. 5 is a bottom plan view of a nut wing washer forming a part of the connector assembly;

FIG. 6 is a view like FIG. 5, but of a main locking disc;

FIG. 7 is an isometric view of the connector assembly in an assembled condition;

FIG. 8 is an exploded isometric view of the connector assembly;

FIG. 9 is a fragmentary sectional view at the lower end of the support leg, showing the lower member in the process of being moved upwardly into the support leg member;

FIG. 10 is a view like FIG. 9, but of a final assembled condition;

FIG. 11 is an isometric view of a modified construction of the nut wing washer, such construction including "grip" fingers surrounding the hexagonal opening in the top of the washer;

FIG. 12 is a fragmentary assembly view, showing the nut wing washer of FIG. 11 installed on a nut, and showing the "grip" fingers contacting the wrench flats on the side of the nut;

FIG. 13 is a view like FIG. 2, but of a modified form of the upper end portion of the assembly, such embodiment showing the entire upper end portion of the tube being swaged to reduce its diameter;

FIG. 14 is a view like FIGS. 2 and 13, but of yet another modified form of the upper end of the assembly, such embodiment including an internally threaded neck section, formed by roll swaging, with the internal threads in such section engaging a stud that is connected to an overhead structure; and FIG. 15 is a view like FIG. 11, of yet another form of nut wing washer.

BEST MODE FOR CARRYING OUT THE INVENTION

FIGS. 1-10 illustrate a preferred form of overhead support member and a preferred form of joint construction.

Referring to FIG. 1, member 10 is an overhead structure.

Member 10 includes a downwardly extending threaded stud 12 (FIG. 2).

In preferred form, a mounting leg 14 includes an insert member 16 at its upper end. Member 16 includes a threaded axial opening 18. The upper end portion of support leg 14 may be swaged about the insert 16, for firmly gripping the insert 16 in this manner. The swaging produces an annular internal rib 20 which produces a reduced diameter interior opening through which the insert 16 cannot pass in the upward direction. The portion of support leg 14 below insert 16 is preferrably swagged to provide a cross section which includes at least one pair of opposed wrench flats 15, 17. The reduced section also prevents downward movement of element 16.

In preferred form, a flat rectangular bar 22 is provided at the lower end of support leg 14. Bar 22 carries a connector assembly 24 which can be easily moved endwise into the tubular lower end portion 26 of the support leg 14.

The connector assembly 24 comprises a stud 28 having a base end 30 which in FIG. 3 is shown to be welded to the member 22. An alternative construction is shown by FIG. 4. In this embodiment the stud 28' is in the form of a bolt having a head 32 at its lower end. The shank of the bolt 28' extends through an opening 34 formed in member 22.

Referring back to FIG. 3, a cam ring 36 is provided at the base end of stud 28. The cam ring 36 includes a base end 38 which contacts the upper surface of member 22. At its opposite end the cam ring 36 includes a beveled edge 40. This beveled edge 40 constitutes a cam surface, the function of which will hereinafter be described. Stud 28 extends upwardly through a central opening 42 in the top of the cam ring 36.

In accordance with the invention, one or more main locking discs 44 are stacked on the stud 28, 28'. Three such main locking discs 44 are shown in FIGS. 1, 3, 4 and 7-10. A nut 46 is provided above the main locking disc(s) 44. Nut 46 includes a flange 48 at its lower end, down onto which the central portion of a nut wing washer 50 sits. The illustrated nut 46 has a wrench flat portion 52 of conventional hexagonal form. The nut wing washer 50 includes a central opening 54 which is sized to snugly receive the hexagonal wrench flat portion 42. When the nut wing washer 50 is installed, there is an engagement between the wrench flats on portion 52 on nut 46 and the edge surfaces of the opening 52 which prevents the nut wing washer 50 from rotating relative to the nut 46. As earlier stated, the nut wing washer 50 sits down on the flange 48 and such flange 48 prevents it from moving axially in the downward direction.

The main lock discs 44 have circular openings 56 at their centers through which the threaded shank portion 56 of the stud 28, 28' extends.

The nut wing washer 50 and the main locking discs 44 have winged portions which are bent down at an angle to a flat central portion. FIG. 5 is a plan view of the nut wing washer 50. By way of example, it is shown to include three wings 58 bent down from a flat central portion 60. The hexagonal opening 54 is formed in the flat central portion 60.

Each wing 58 forms a dihedral with the flat central portion 60. The outer edges 62 of the wings 58 may be plain or may be serrated, as illustrated. In any event, the edges 62 lie on a circle which is generated from the center 64 of opening 54. This circle is slightly larger in diameter than the inside diameter of the tubular end portion 26 of member 14.

The nut wing washer 50 may be constructed from a thinner material than the main locking discs 44, for reasons to be hereinafter explained.

As shown in FIG. 6, each main locking disc 44 includes three wings 66 equally spaced about the locking disc 44. Each wing 66 forms a dihedral with a flat central portion 68. The outer edges 70 of the wings 44 may be plain or serrated. The serrated form is illustrated.

As shown by FIG. 6, the edges 70 lie on circles having their center at the center 72 of circle 56. The circle on which the edges 70 lie is either substantially equal to or slightly less in diameter to the inside diameter to the tubular end portion 26 of member 14, so that the main lock discs will not interfere with easy insertion of the connector assembly into the socket 26.

The connector assembly is assembled as follows. The stud 28, 28' is connected to the member 22. By way of example, this can be done by welding (FIG. 3) or by making said stud in the form of a bolt (FIG. 4). The cam ring member 36, 36' is then installed onto the stud 28, 28'. Next the main locking disc(s) 44 is placed onto the stud 28, 28', with their wings 44 extending downwardly toward the cam surface 40. Next, the nut 46 is installed and is screwed down until it contacts the main locking disc 44 (or the top main locking disc 44 in a stack). Then the nut wing washer 50 is set into place. Next, a retainer ring 74 is installed over the wrench surface portion 52 of the nut 56. This ring may include a plurality of radially inwardly extending fingers, some of which are designated 76. These fingers contact the side surfaces of the wrench flat portion 52 of nut 46. The relative dimensioning is such that the fingers 76 must bend in order for ring 74 to be pushed onto the nut 46. The bending of fingers 76 make them function as springs for gripping the side surfaces of nut portion 52. Once the ring 74 is installed it is very difficult to remove and so it functions to hold the nut wing washer 50 in place so that it will not move axially off of the nut 46 in the upward direction.

In another embodiment, the edges of opening 46 could be constructed to include gripping fingers to perform the same function, so that a separate retainer ring 74 is not needed.

After the elements 36, 44, 46, 50, 74 are installed onto the stud 28, 28', the upper or free end of the stud 28, 28' may be split and spread, as shown by FIGS. 3, 4, 7, 9 and 10, for the purpose of preventing removal of the nut 46 from the stud 28, 28'. This particular technique is per se old.

After the connector assembly is on the stud 28, 28', such assembly is aligned with the open end of tubular portion 26 of support leg member 14, and then member 22 is moved upwardly, to force the connector assembly into the interior of end portion 26. This procedure is illustrated in FIG. 9.

As stated above, the nut wing washer 50 is constructed to have the edges 62 of its wings 58 lie on a circle that is larger in diameter than the inner diameter of tubular portion 26. Accordingly, in order for the nut wing washer 50 to enter into the interior of tubular portion 26, the wings 58 must bend downwardly some from their original position. The nut wing washer 50 is constructed from a sheet metal of suitable thickness to allow this bending to easily occur, but at the same time have enough stiffness in the wings 58 that once the nut wing washer 50 is inside of tubular portion 26, the wings 58 will grip the cylindrical wall of portion 26 a sufficient amount to hold the nut 46 against rotation during rotation of member 22.

As previously described, the edges 70 of the main locking discs 44 lie on a circle that is of such a dimension that the locking discs can be easily moved endwise into the tubular portion 26. However, at the same time, the edges 70 are either already in contact with the inner surface of tubular member 26, or are at least closely adjacent to the inner surface of tubular portion 26.

After the connector assembly is within the tubular portion 26 the member 22 is rotated. The nut wing washer 50 holds nut 46 against rotation and so there is an axial movement of the nut 46 along the stud 28, 28'. When the member 22 is rotated in the clockwise direction the nut 46 travels along the stud 28, 28' toward the member 22. This causes a squeezing of the main lock disc(s) 44 between the nut 44 and the cam ring 36. The beveled edge 40 of cam ring 36 imposes an axial force on the wings 44, causing them to swing upwardly. As this movement occurs, the edge diameter increases and the edges of the main lock disc(s) 44 are moved into a "biting" displacement with the inner wall of tubular portion 26. The member 22 is rotated until further rotation is very difficult and the member 22 is properly oriented relative to the desired position of the member that is going to be attached to it. At this time the edges 62 of washer 50 and the edges 70 of locking disc(s) 44 have been moved into the wall material of tubular portion 26 an amount sufficient that the member 22 is securely connected to support leg 14 and will remain connected when subjected to forces which exceed the forces that the members 14, 22 are designed to encounter.

The hanger assembly shown by FIG. 1 is especially adapted for use in connecting lighting fixtures to ceilings in naval ships. At the present time, there are hanger structures in existence which include a vertical support leg that is welded at its upper end to a ceiling structure, and is welded at its lower end to a support bar. If it ever becomes necessary to remove the structure, it becomes necessary to cut the welds or the members.

The support structure shown by FIG. 1 can be usually secured to and removed from a ceiling structure. If after the assembly has been installed, in the manner described above, it becomes necessary to remove the hanger structure for some reason, this can be easily done without damage. The light fixture or whatever other structure is secured to the member 22 is first removed. Then, the support leg 14 is rotated in the screw loosening direction, for unscrewing the threaded joint at the upper end of member 14. The hanger 14, 22 can be easily reattached by again screwing the leg member 14 to the ceiling stud 12. When the joint is tightened, the member 22 will be substantially back to its proper position. A wrench can be applied to the flats 15, 17 and used for turning the leg 14 relative to the stud 12.

FIG. 11 shows the modified form of the nut wing washer 50'. This form includes fingers 80 spaced about the sides of the hexagonal opening 54'. These fingers 80 make frictional contact with the wrench flat portions 52 of nut 46. As in the earlier form, the wings 58' may included seriations 62' at their edges.

FIG. 15 shows another way of constructing the nut wing washer 50". This form includes fingers or tabs 80' spaced around the sides of the hexagonal opening 54". As in the embodiment shown by FIG. 11, these fingers 80' make frictional contact with the wrench flat portions 52 of the nut 56. The fingers 80' bend upwardly from a generally conical ring section 82. The wings 58"
bend downwardly from flat sections 84. Flat tabs 86
may be provided in the regions between the fingers 58''',
and be bent upwardly. The purpose of the conical section 82 and the tabs 86 is to stiffen the main body of the
nut wing washer 50", so that it will not easily distort in
response to the bending of the wings 58" which occurs
when the connector assembly is inserted into a socket.

Referring to FIG. 13, the upper end of the support
leg 14' in this embodiment is swaged at 20'. This swaged
portion 20' replaces the annular groove 20 shown in
FIG. 2. In other respects, the upper end portion of this
assembly is like the upper end portion shown by FIG. 2.

FIG. 14 shows yet another modified construction of
the upper end portion of the support leg 14". In this
embodiment, the upper end 72 of the tube 14" is round.
Immediately below this round section 72 there is a reduced neck section 74, produced by roll swaging. This
section 74 is internally threaded at 76. The threads 76
mate with the stud 12 that is secured to the overhead
structure 10. The region immediately below neck section 74 may be formed to be square in cross section, so
as to provide external wrench flats 15', 17'. A normal
round section 78 may begin below the square section
and continue from there down to the lower end of the
pipe 14".

The expansion mechanism of this invention does not
involve a mere "friction" fit. The edges of the wings
actually penetrate into the socket wall material. There is
a galling action. The wings deform and displace the
wall material and dig progressively further into the
socket wall as the withdraw force is increased. Under
actual test, there was zero creep at 10,000 lbs. of load
acting to withdraw the insert from the socket. A friction
type expansion anchor would experience creep at a load
of about 400 lbs. or less.

The joint construction formed between member 22
and the lower end of support leg 14 has utility in other
installations in addition to the installation illustrated by
FIG. 1. Member 22 can be any member, and can itself
be a tubular member. The tubular portion 26 may be an
end piece, or a socket portion of a nontubular member.

In accordance with the established law of patent
interpretation, the embodiment that has been illustrated
and described has been submitted by way of an example
only. The scope of protection provided by the patent is
to be determined by the terms of the following claims,
and by the doctrine of equivalents.

What is claimed is:
1. A joint construction, comprising:
 a first member including a cylindrical sidewall defining a socket having an inner surface;
 a second member including a connector assembly, said connector assembly comprising an axially-extending stud having a base, a free end and a threaded portion adjacent the free end;
 a cam ring at the base of the stud having a base end and an opposite end, said cam ring being smaller in diameter than the inside diameter of said socket, said cam ring including a beveled edge at its opposite end;
 a main locking disc having a center opening through which the stud extends, and a plurality of wings spaced around the disc and bent to extend towards the beveled edge of the cam disc, said main locking disc having a plan form sized to slip fit into said socket and said wings having outer edges;
 a nut threaded onto the threaded portion of the stud outwardly of the main lock disc;
 a nut wing washer secured against rotation to the nut, said nut wing washer having a plurality of wings bent to extend towards the cam ring, and having a plan form that is larger than the inside diameter of said socket, said wings having outer edges; means for holding the nut wing washer against axial movement off of the nut; and
 wherein the first and second members are connected together by an insertion movement of the connector assembly on the second member into the tubular socket of the first member, with such movement causing a bending of the wings of the nut wing washer, attended by the outer edges of such wings gripping the inner surface of the socket and holding the nut wing washer against rotation, followed by a rotation of the second member relative to the first member, with the nut wing washer holding the nut in position relative to the first member during such rotation, causing relative axial travel of the nut on the stud towards the cam ring, and with such axial travel causing the beveled edge of the cam ring to push the wings of the main locking discs outwardly, so as to press their outer edges into tight gripping engagement with the inner surfaces of the socket.

2. A joint construction according to claim 1, comprising a plurality of main locking discs of the character described, positioned on the stud between the nut and the cam ring.

3. A joint construction according to claim 1, wherein the nut wing washer is thinner than the main locking disc.

4. A joint construction according to claim 2, wherein the nut includes a flange at its end nearest the cam ring, and said nut wing washer fits down on said flange.

5. A joint construction according to claim 1, comprising a plurality of main locking discs on the stud between the nut and the cam ring, with said nut wing washer being thinner than the main locking disc.

6. A joint construction according to claim 1, wherein said stud includes means at its free end for preventing removal of the nut from the stud.

7. A joint construction according to claim 1, wherein the nut includes a plurality of wrench surfaces spaced about it, and said nut wing washer includes an opening corresponding in shape to the nut lock surfaces into which the nut fits.

8. A joint construction according to claim 7, wherein the nut includes a flange at its end nearest the cam ring, and said nut wing washer fits down on said flange in a direction away from the lip.

9. A mounting structure for a suspended object, comprising:
 a support leg member having a lower end portion defined by a cylindrical sidewall having an inner surface;
 a frame member including a connector assembly, said connector assembly comprisng an axially-extending stud having a base, a free end and a threaded portion adjacent the free end;
 a cam ring at the base of the stud having a base end and an opposite end, said cam ring being smaller in diameter than the inside diameter of the tubular portion of the support leg, and including a beveled edge at its opposite end;

a main locking disc having a central opening through which the stud extends, and a plurality of wings spaced around the disc and forward to extend towards the beveled edge of the cam ring, said main locking disc having a plan form sized to fit closely into said tubular end portion of the support leg;

a nut threaded onto the threaded portion of the stud outwardly of the main locking disc;

a nut wing washer secured to the nut, said nut wing washer having a plurality of wings forward to extend towards the cam ring, and having a plan form that is larger than the inside diameter of said tubular first member;

means for holding the nut wing washer against axial movement off of the nut; and wherein the frame member is connected to the support leg member by first a movement of the connector assembly on the frame member into the tubular end portion of the support leg member, with such movement causing bending of the wings of the nut wing washer, attended by edges of such wings gripping the inner surface of the tubular end portion of the support leg member, and holding the nut wing washer against rotation, followed by the rotation of the frame member relative to the support leg member, with the nut wing washer holding the nut in position relative to the support leg member during such rotation, causing relative axial travel of the nut on the stud towards the cam ring, and with such axial travel causing the beveled edge of the cam ring(s) to push the wings of the main locking discs outwardly, so as to press their edges into tight gripping engagement with the inner surface of the tubular end portion of the support leg member.

10. A joint construction according to claim 9, comprising a plurality of main locking discs of the character described, positioned on the stud between the nut and the cam ring.

11. A joint construction according to claim 9, wherein the nut wing washer is thinner than the main locking disc.

12. A joint construction according to claim 9, comprising a plurality of main locking discs on the stud between the nut and the cam ring, with said nut wing washer being thinner than the main locking disc.

13. A joint construction according to claim 9, wherein the nut includes a plurality of wrench surfaces spaced about it, and said nut wing washer includes an opening corresponding in shape to the nut and lock surfaces.

14. A joint construction according to claim 9, wherein said stud includes means at its free end for preventing removal of the nut from the stud.

15. A mounting structure according to claim 9, comprising a frame member in the form of a bar which forms a "T" with the support leg.

16. A mounting structure according to claim 15, wherein the stud is welded at its base end to the bar.

17. A mounting structure according to claim 15, wherein said stud has a head at its base end, said bar includes an opening through which the stud extends and said head contacts the bar about the hole.

18. A mounting structure according to claim 9, which has an upper end and said structure includes a ceiling mounting plate at said upper end.

19. A mounting structure according to claim 18, comprising a detachable screw connection between said ceiling mounting plate and said support leg.

20. A mounting structure according to claim 19, wherein said ceiling mounted plate includes a threaded ceiling stud and said upper end of said support leg includes a threaded opening for receiving said ceiling stud.

21. A mounting structure according to claim 9, wherein said support leg is a length of tubing and at its upper end it includes an insert having a threaded axial opening for receiving said ceiling stud.

22. A mounting structure according to claim 21, wherein said length of tubing is squeezed into tight gripping contact with said insert.

* * * * *